(12) United States Patent
Nemiroff et al.

(10) Patent No.: US 6,195,393 B1
(45) Date of Patent: Feb. 27, 2001

(54) HDTV VIDEO FRAME SYNCHRONIZER THAT PROVIDES CLEAN DIGITAL VIDEO WITHOUT VARIABLE DELAY

(75) Inventors: Robert Nemiroff; Vicky B. Kaku, both of San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/110,930

(22) Filed: Jul. 6, 1998

(51) Int. Cl.[7] ...................................................... H04B 1/66
(52) U.S. Cl. ...................................................... 375/240.28
(58) Field of Search .............................. 348/845.1, 845.2, 348/384, 385, 390, 426, 466, 500, 518, 735; 370/333, 503, 506; 375/341, 346, 354, 359, 368, 240.28; 714/775, 707, 747

(56) References Cited

U.S. PATENT DOCUMENTS

| | | | |
|---|---|---|---|
| 4,653,074 | * 3/1987 | Griffin et al. | 348/735 |
| 5,267,036 | * 11/1993 | Habraken et al. | 348/384 |
| 5,732,352 | * 3/1998 | Gutowski et al. | 370/333 |
| 5,751,773 | * 5/1998 | Campana, Jr. | 370/503 |
| 5,835,165 | * 11/1998 | Keate et al. | 348/845.1 |

* cited by examiner

*Primary Examiner*—Chris S. Kelley
*Assistant Examiner*—Gims Philippe
(74) *Attorney, Agent, or Firm*—Barry R. Lipsitz

(57) ABSTRACT

A system for processing a sequence of video or other data frames at a data encoder during a sync loss. During a sync loss of input data at a video or other data encoder, substitute data such as black video is used to provide complete "clean" data frames to a compressor at the encoder. Artifacts due to compression and encoding of partial frames are avoided. If a sync loss is detected in the middle of a particular data frame that is input to the encoder, the remainder of the frame is completed with substitute data which is in sync with the earlier data in the frame. Additional complete frames of the substitute data are provided to the compressor following the particular data frame, still in sync with the particular frame, until such time that a sync recovery is detected, and a field or frame check is performed on the new, post-sync loss, data to gain confidence of the sync recovery. A null signal may be provided to the compressor after the last substitute frame, and prior to the post-sync loss frame after the frame in which the field or frame check occurs. Different frame and video clock rates in the post-versus pre-sync loss frames are automatically accounted for.

32 Claims, 7 Drawing Sheets

HDTV VIDEO FRAME SYNCHRONIZER THAT PROVIDES CLEAN DIGITAL VIDEO WITHOUT VARIABLE DELAY

BACKGROUND OF THE INVENTION

The present invention relates to a method and apparatus for processing a sequence of video or other data frames at a data encoder during a synchronization ("sync") loss. When a sync loss is detected, black or pre-stored frames are provided in sync with the pre-sync loss frames until re-synchronization has been established. Null data is provided if necessary when the post-sync loss frames are not synchronized with the pre-sync loss frames. The invention is particularly suitable for use with a digital video encoder that encodes High-Definition Television (HDTV).

The communication of digital video, audio, and other data has become increasingly common due to the improved fidelity, bandwidth efficiency, and versatility of digital signals relative to analog signals. For example, many cable television (CATV) networks deliver digital television signals to users' homes via coaxial cable, or hybrid fiber and coaxial cable networks. Moreover, in addition to television signals, various other signals may be provided to the user, including audio only, video only, including still frame video, as well as data services, including Internet data, stock or weather data, computer games, and so forth.

The television or other data is transmitted from a headend of the cable network to a decoder at the user's home, or directly to the user's home, e.g., via satellite or terrestrial broadcast, and processed by the decoder to provide an output signal having a format that is compatible with the user's television, computer or other equipment.

The television or other data may be obtained by the headend via various methods. For example, the headend may have a local library of digital television programs or other data which is stored on magnetic storage media such as magnetic tape, or optical storage media, such as compact disc, digital video disc, or laser disc. The headend may also receive digital television or other data from a transmission source, including, for example, a satellite distribution network, a terrestrial broadcast network, or a microwave distribution network.

Each frame in a video or other data signal includes timing, or clock, information that allow a video encoder to be synchronized with the signal to allow proper compression and encoding. It is problematic that a sync loss may be experienced at the video encoder due to a number of factors. For example, a change in data source, e.g., from a live television broadcast to a pre-recorded movie, may result in a sync loss, thereby causing undesirable visible or other artifacts in the transmitted data stream. Additionally, a data dropout due to a defect in a data storage medium or noise in a transmission channel may result in a sync loss.

Furthermore, a change in data source may be accompanied by a change in video clock rate. For example, the HDTV format of 1920 horizontal pixels×1080 active video lines×30 fields per second interlaced scan (e.g., 540 active video lines per field) has a clock at 74.25 MHz, while the format of 1920 horizontal pixels×1080 active video lines× 29.97 fields per second interlaced scan (e.g., 540 active video lines per field) has a clock at 74.175 MHz. These HDTV formats are discussed in the document SMPTE 274M, entitled "Proposed SMPTE Standard for Television– 1920×1080 Scanning and Analog and Parallel Digital Interfaces for Multiple-Picture Rates." It is difficult for the encoder to re-synchronize with the new video clock.

Additionally, a data buffer which receives the input data signal may overflow during a sync loss since no encoding and transmission of the received data occurs.

Accordingly, it would be desirable to provide a system for processing a sequence of video or other data frames which are input to a data encoder/compressor during a sync loss. The system should provide substitute data, such as black or pre-stored data, to a data compressor that are synchronized with the pre-sync loss data frames until synchronization is re-established. For example, for frames of video data, black frames may be provided to the compressor.

The system should accommodate a change in clock rate of the post-sync loss frames relative to the pre-sync loss frames.

The system should further accommodate post-sync loss frames which are either synchronous or asynchronous with the pre-sync loss frames.

The system should provide a null signal to the compressor, if required, during a period following the establishment of resynchronization and prior to communication of a new data frame to the compressor.

The system should manage a buffer fullness level in the data encoder to prevent overflow during a sync loss.

The present invention provides a system having the above and other advantages.

SUMMARY OF THE INVENTION

The present invention relates to a method and apparatus for processing a sequence of video or other data frames at a data encoder during a sync loss.

During a sync loss of input data at a video or other data encoder, the present invention provides only complete data frames to a compressor at the encoder by generating substitute data as required. By providing only complete data frames, undesirable data artifacts are avoided. Sync loss may occurs when the encoder's data source is switched.

For example, if a sync loss is detected in the middle of a particular data frame that is input to the encoder, the remainder of the frame is completed with substitute data which is in sync with the earlier data in the frame. Additionally, complete "clean" frames of the substitute data are provided to the compressor following the particular data frame, still in sync with the particular frame, until a sync recovery is detected, and a field or frame check is performed on the new, post-sync loss, data to gain confidence of the sync recovery.

If the post-sync loss data is not in sync with the pre-sync loss data (i.e., there is a different time base), it may be necessary to provide a null signal to the compressor after the last substitute frame, and prior to the post-sync loss frame after the frame in which a field or frame check occurs. This post-sync loss frame is referred to as a post-check frame. Different frame and video clock rates in the post-versus pre-sync loss frames are automatically accounted for.

In accordance with the present invention, a method for processing frames of data that are input to a data encoder when a loss of synchronization between the input data frames and the encoder is detected, includes the steps of: monitoring the input data frames to detect a sync loss; providing pre-sync loss input data of the input data frames to a data compressor of the encoder prior to detection of the sync loss; and providing substitute data to the data compressor in synchronism with the pre-sync loss input data when the sync loss is detected.

The input data frames continue to be monitored to detect a sync recovery; and the post-sync loss input data of the input data frames is provided to the data compressor after the sync recovery is detected, and after a last frame including the substitute data is provided to the data compressor.

The input data frames may include video data, in which case the substitute data may include black video data, which is generated real-time as needed.

The substitute data may be pre-stored in a memory. For example, the last pre-sync loss frame may be pre-stored and communicated to the compressor. For a video application, this would allow the viewer to see the last good video frame, for example, or some other default video frame, rather than a black screen. However, additional memory is required.

Sync loss may be detected by monitoring start of active video (SAV) and/or end of active video (EAV) fields of video lines of the pre-sync loss input data.

The method may include the step of monitoring an input clock signal that is associated with the pre-sync loss input data to detect the sync loss.

A first complete frame that includes the pre-sync loss input data and the substitute data may be provided to the data compressor when the sync loss occurs in the middle of the frame (e.g., after the start but before the finish of the frame). The first complete frame is followed by one or more complete frames that include the substitute data instead of the input data until sync recovery is detected and the new post-sync loss frames are available.

A field or frame check may be performed on a post-sync recovery frame, which is the first or later full frame of the post-sync loss input data after the sync recovery is initially detected; and the following frame, termed a "post-check frame", which is the first frame of the post-sync loss input data after the post-sync recovery frame, may then be provided to the data compressor. Additionally, a null data sequence may be provided to the data compressor after the last substitute frame is provided to the data compressor, and until the post-check frame is provided to the data compressor.

The method may include the further steps of buffering the input data frames; and providing a buffer reset signal after the sync recovery is detected, and prior to a start of the post-check frame. The buffer reset signal is used to reset a buffer pointer to re-initialize the system.

The method may include the further step of monitoring an input clock signal that is associated with the post-sync loss input data to detect the sync recovery.

When the first full frame or field of the postsync recovery frame includes a plurality of video lines, at least some of the lines having start of active video (SAV) or end of active video (EAV) fields, the method includes the further step of: performing the field or frame check on the first full frame of the post-sync recovery frame by monitoring the SAV or EAV fields thereof.

A corresponding apparatus is also presented.

DETAILED DESCRIPTION OF THE INVENTION

The present invention relates to a method and apparatus for processing a sequence of video or other data frames at a data encoder during a sync loss.

Figure 1:
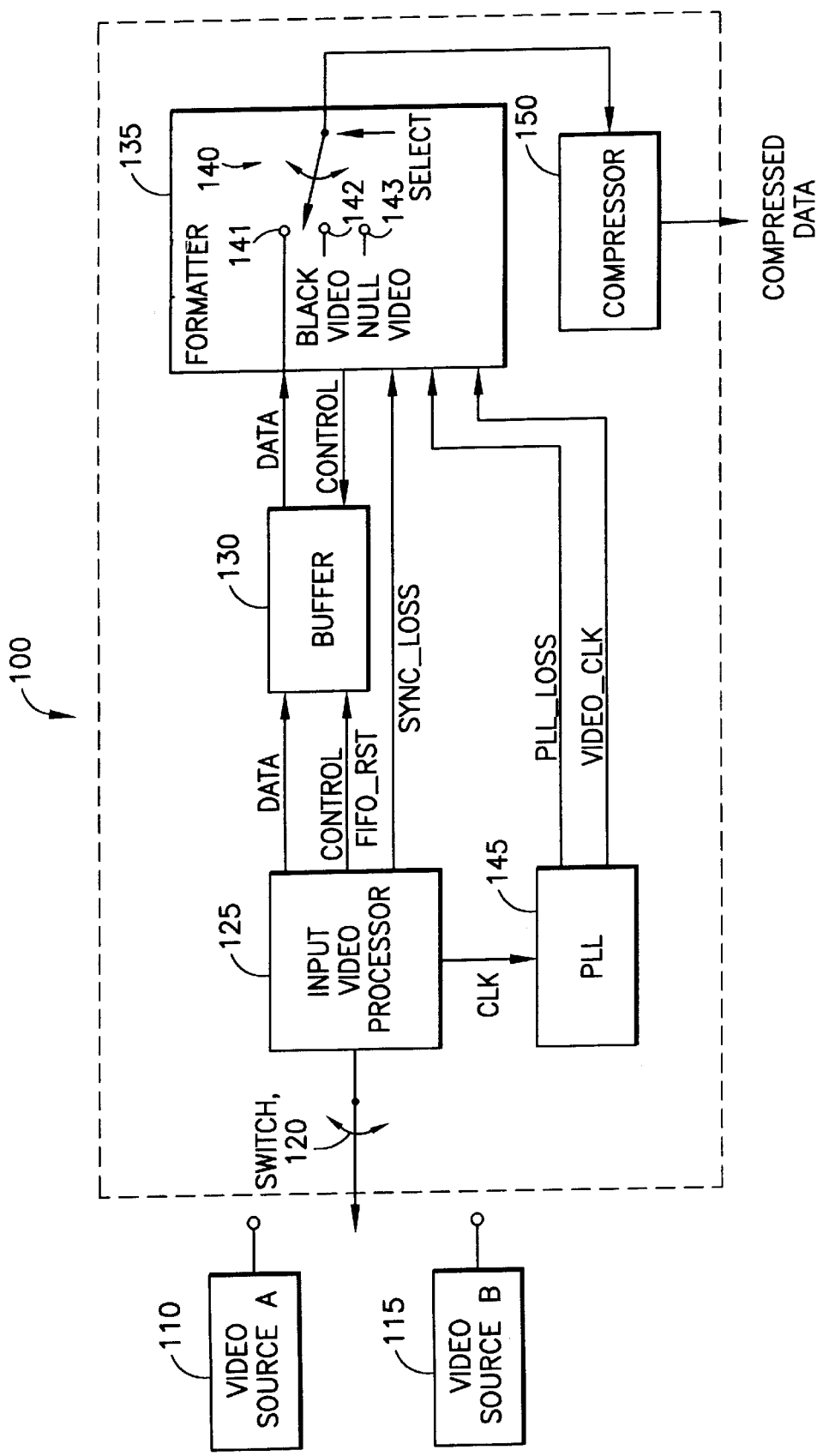
FIG. 1 illustrates a video encoder in accordance with the present invention.

FIG. 1 illustrates a video encoder in accordance with the present invention. A video encoder showing generally at 100 processes digital pixel samples which are received from a local library or a transmission channel. The pixel samples may be compressed using motion compensation and estimation, then quantized and encoded for transmission or subsequent storage. In the example of FIG. 1, the encoder 100 is shown receiving pixel samples from two different video sources, either video source A 110 or video source B 115, according to the position of a switch 120. For example, the encoder 100 may be used at the headend of a cable television system, and the video sources A and B may comprise a digital data storage medium such as magnetic tape or optical disc.

Alternatively, or in addition, the encoder may receive digital data from a transmission channel such as a satellite network. Additionally, the received data may include video, audio, and/or other data. The present invention is particularly suitable for use with video data, but may be used with any framed data format.

As discussed above, a sync loss between a received framed data stream and a data encoder may be caused by a number of factors, including a change in video source as shown in FIG. 1, or a data dropout. The pixel data received by the encoder 100 may have an HDTV format corresponding to the SMPTE 274M or 260M standards, e.g., 1920× 1080 pixels interlaced scan, or SMPTE 296M, e.g., 1280× 720 pixels progressive scan. As explained below in connection with FIGS. 6 and 7, each frame of pixel data includes a number of video lines, and each line includes a start of active video (SAV) field, and an end of active video (EAV) field. The specific format of these fields or data sequences is discussed in the aforementioned SMPTE standards.

An input video processor 125 detects either or both of the SAV and EAV sequences to synchronize with the received data frames. The frequency of occurrence of the SAV and EAV fields essentially corresponds to the line rate of the received data. The input video processor 125 may declare a sync loss when the SAV and/or EAV sequences are not detected at the expected times, or if the bits of the SAV and EAV fields are incorrect. If a sync loss is detected, the input video processor 125 provides a control signal, SYNC_ LOSS, to a formatter 135. The input data is also provided from the processor 125 to a First-In First-Out (FIFO) buffer 130 regardless of whether a sync loss has been declared. The processor 125 also provides control data and a FIFO reset signal, FIFO_RST, to the buffer 130, as discussed in greater detail below in connection with FIGS. 2, 3 and 5.

The input video processor 125 also receives a clock signal, CLK, that is associated with the input video, and provides CLK to a phase-locked loop (PLL) 145. The successive pulses of CLK form a video sample clock, e.g. at 74.175 MHz or 74.25 MHz. The PLL 145 operates in a conventional manner to synchronize with CLK such that a locked condition is detected. The PLL 145 sends a control signal, PLL_LOSS, to the formatter 135 designating whether a lock condition exists, along with a video clock signal, VIDEO_CLK, corresponding to CLK. If the PLL 145 is not locked, PLL_LOSS will have a logical true value, while PLL_LOSS will have a logical false value if the PLL 145 is locked.

The formatter 135 receives the input data from the buffer 130, the SYNC_LOSS signal from the processor 125, and the PLL_LOSS signal from the PLL 145. The formatter 135 also provides a control signal to the buffer 130, and a select signal to activate a switch 140. The switch 140 may select the input video data at terminal 141 or a black video signal at terminal 142, or a null (e.g., zero) video signal at terminal 143. Note that, at terminal 142, instead of generating black video real-time as needed, any pre-stored data may be provided including, for example, the most recent video frame prior to the sync loss. However, a different memory structure is required to provide pre-stored data. The term "substitute data" is used herein to refer to the black or pre-stored data that is provide to the compressor during a sync loss. The term "pre-stored" is used herein to designate data that is stored before it is needed rather than being generated real-time when needed.

The data output from the switch 140 is provided from the formatter 135 to a data compressor 150, which implements conventional compression techniques to provide a compressed data stream, e.g., for transmission to a user's home via a CATV network.

The formatter 135 may include known circuitry for providing the black video frames at terminal 142 in sync with the input video frames. A sequence of black frames, also known as a black burst, does not contain any active video information. For example, for NTSC video, a black level of 0.357 V may be used. The black video frames are synchronized with the input video frames prior to a sync loss, and are provided to the compressor using the pre-sync loss timing until new post-sync loss frames are available. The black frames may be generated real-time as needed.

Figure 2:
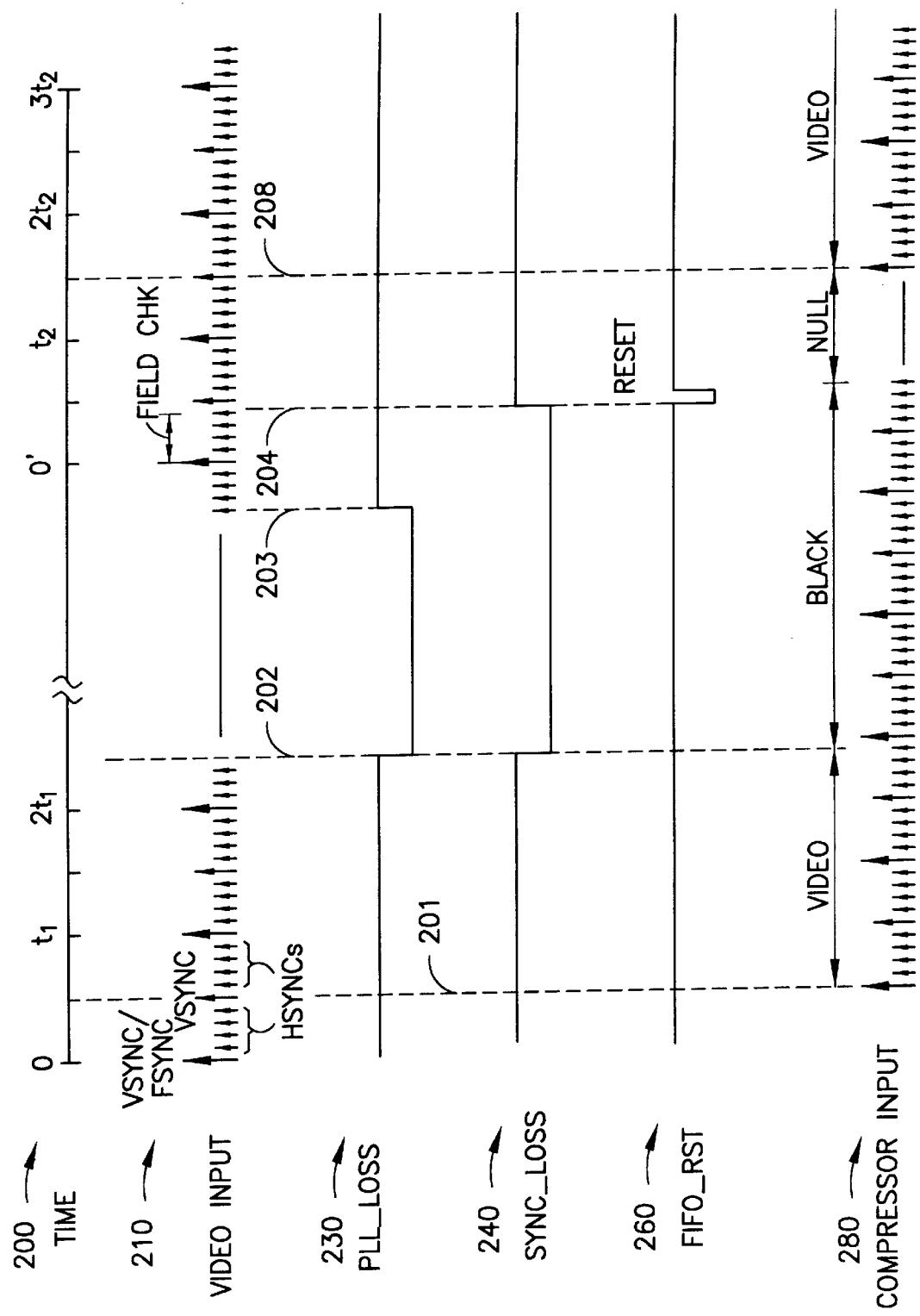
FIG. 2 illustrates an interlaced scan video input and a compressor input time line during a sync loss in accordance with the present invention.

FIG. 2 illustrates an interlaced scan video input and a compressor input time line during a sync loss in accordance with the present invention. A time line shown generally at 200 extends in a first continuous manner from reference points 0, $t_1$, and $2t_1$, and from 0', $t_2$, $2t_2$, and $3t_2$. A video input time line 210 includes successive vertical synchronization (VSYNC) signals, frame synchronization (FSYNC) signals, and horizontal synchronization (HSYNC) signals. FSYNC designates the start of a video frame, while VSYNC designates the start of each field for interlaced video, and HSYNC designates the start of each video line. For example, for 1920×1080 pixel interlaced scan format, there are 540 active video lines per field, and two fields per frame. The actual number of HSYNC fields is greater than that shown.

Time line 230 shows the status of signal PLL_LOSS, where a high value indicates PLL_LOSS is false and a low value indicates PLL_LOSS is true. The time line 240 shows the status of the SYNC_LOSS field, where a high value indicates SYNC_LOSS is false, and a low value indicates SYNC_LOSS is true. A time line 260 shows the status of the FIFO_RST signal, where a high value indicates FIFO_RST is false and a low value indicates FIFO_RST is true. Thus, in FIGS. 2, 3 and 5, PLL_LOSS, SYNC_LOSS and FIFO_RST are active low signals.

A time line 280 shows an input to the compressor 150 of FIG. 1. The compressor input 280 corresponds to the video input 210 to the processor 125, with a delay of one field due to the storage of the input video in the buffer 130 prior to transfer to the formatter 135 and compressor 150. During the period between the time indicated by dashed lines 201 and 202, the compressor input 280 corresponds to the delayed video input. That is, the frame of the video input 210 beginning at time 0 corresponds to the frame at the compressor input 280 at time $0.5t_1$.

At the time indicated by the dashed line 202, PLL_LOSS 230 and SYNC_LOSS 240 transition from false to true, indicating a PLL loss and sync loss in the video input 210. At this time, the switch 140 of the formatter 135 is activated to input black video to the compressor.

The video input 210 is out a sync for a period of time between dashed lines 202 and 203. At the beginning of the next frame of the video input following recovery of the PLL, at time 0', a field check begins. During the field check, the SAV and/or EAV field in each video line is monitored to ensure it is correct for the duration of a video field (e.g., 540 active video lines). The field check may last for less than, or more than, one field, if desired. However, the duration of the field check should be sufficient to conclude with confidence that sync has been regained. Once the field check has been successfully completed, as indicated at the time designated by dashed line 204, SYNC_LOSS transitions from true to false. The field check is successfully completed just prior to time $0.5t_2$. The field in the period from 0' to $0.5t_2$ is termed a "post-sync recovery field" since it is the first full field after sync recovery, as indicated by PLL_LOSS.

Following the transition of SYNC_LOSS at dashed line 204, FIFO_RST transitions from high to low and back to high, thereby indicating a reset condition of the buffer 130, at which time the buffer pointer is initialized. Although the FIFO_RST transition is shown occurring just after the SYNC_LOSS transition, the FIFO_RST transition may generally occur any time after the SYNC_LOSS transition (just prior to time $0.5t_2$) but before the start of the next frame (at time $t_2$).

Also, at the completion of the black video frame that is being communicated to the compressor when SYNC_LOSS transitions from low to high, the switch 140 in the formatter 135 is activated to output a null video signal to the compressor. In this manner, any data that is provided to the compressor during a sync loss and sync recovery is provided as a complete frame. Or, if a complete black frame cannot be provided since it will overlap with the start of a post-sync loss input video frame, a null signal is provided after the end of the black frame but prior to the post-sync loss input video frame. The null input continues to be selected until the first input video frame after the buffer reset (e.g., the video input frame beginning at time $t_2$) is available to the formatter 135. When this post-check frame is available at the formatter 135, the switch 140 is activated to communicate the input video data to the compressor. Accordingly, at the time indicated by dashed line 208 (e.g., $1.5t_2$), the compressor receives and begins compressing the video frame corresponding to the video input 210 at time $t_2$.

Note that the post-sync loss frames may have a different frame rate, and/or a different video clock rate, than the pre-sync loss frames. Moreover, the post-sync loss frames may be synchronous (using the same time base) or asynchronous (using a different time base) with the pre-sync loss frames. For synchronicity, the time line portion represented by 0, $t_1$, and $2t_1$ will be continuous with the time line portion represented by 0', $t_2$, $2t_2$, and $3t_2$. Accordingly, the duration of the null input to the compressor may vary or may not exist at all. For pre- and post-sync loss frames with the same frame time base, no null input is required since the post-check frame will immediately follow the end of the last black frame.

Figure 3:
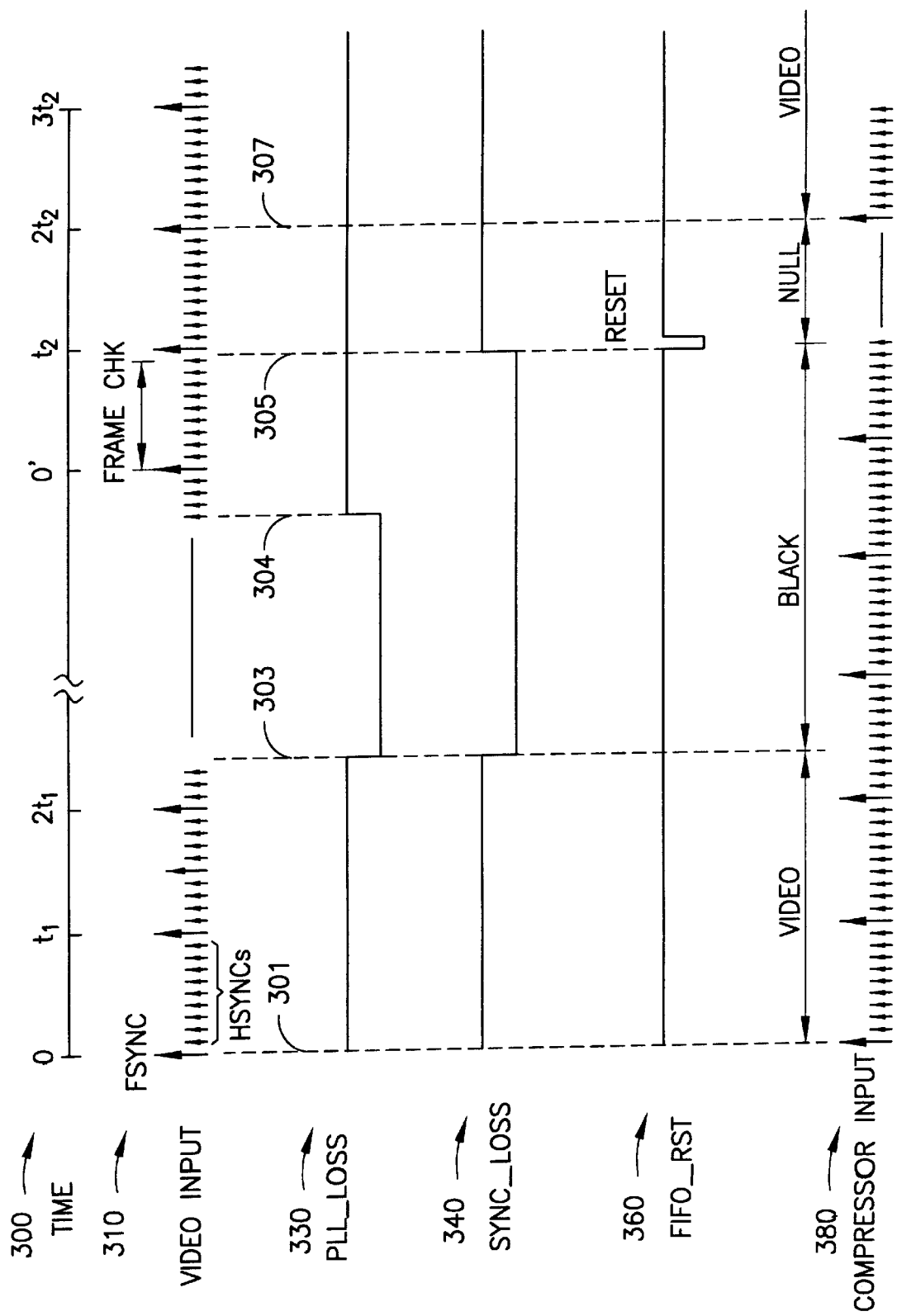
FIG. 3 illustrates a progressive scan video input and a compressor input time line during a sync loss in accordance with the present invention.

FIG. 3 illustrates a progressive scan video input and a compressor input time line during a sync loss in accordance with the present invention. A time line 300 includes a first continuous portion designated by 0, $t_1$, $2t_1$, and a second continuous portion designated by 0', $t_2$, $2t_2$, and $3t_2$. A video input time line 310 includes a number of frames, where the beginning of each frame is indicated by a FSYNC signal, and each line in a frame has a corresponding HSYNC signal. A PLL_LOSS time line 330, a SYNC LOSS time line 340, FIFO_RST time line 360 and compressor input time line 380, are also shown. The compressor input 380 corresponds to the video input 310, with a delay of one frame due to the storage of the input video in the buffer 130 prior to transfer to the formatter 135 and compressor 150. For example, the compressor input frame 380 at time $t_1$ corresponds to the video input frame at time 0.

At the time indicated by a dashed line 303, PLL_LOSS and SYNC_LOSS transition from high to low, thereby indicating a sync loss in the video input. At this time, the switch 140 of the formatter 135 is activated to select the black video input for the compressor.

At the time indicated by dashed line 304, PLL_LOSS transitions from low to high, indicating that CLK has been recovered by the PLL 145. Then, starting at time 0', which corresponds to the start of the next frame following PLL recovery, e.g., a "post-sync recovery frame", a frame check is performed. At a time indicated by dashed line 305, the frame check is successfully completed and, just prior to the beginning of the frame at time $t_2$, SYNC_LOSS transitions from low to high indicating that sync has been regained. FIFO_RST 360 indicates a reset immediately following the transition of SYNC_LOSS at time 305 since the reset must be performed prior to the start of the next frame at time $t_2$. FIFO_RST will re-initialize the buffer pointers. Also, at the end of the black video frame which is being communicated to the compressor when SYNC_LOSS transitions from low to high, the switch 140 in the formatter 135 is activated to select the null video input until time $2t_2$. Once the post-check frame is available to the compressor, the switch 140 is activated to communicate the input video to the compressor. Specifically, the post-check frame of the video input 310, which starts at time $t_2$, is communicated as the compressor input 380 at time $2t_2$.

Figure 4:
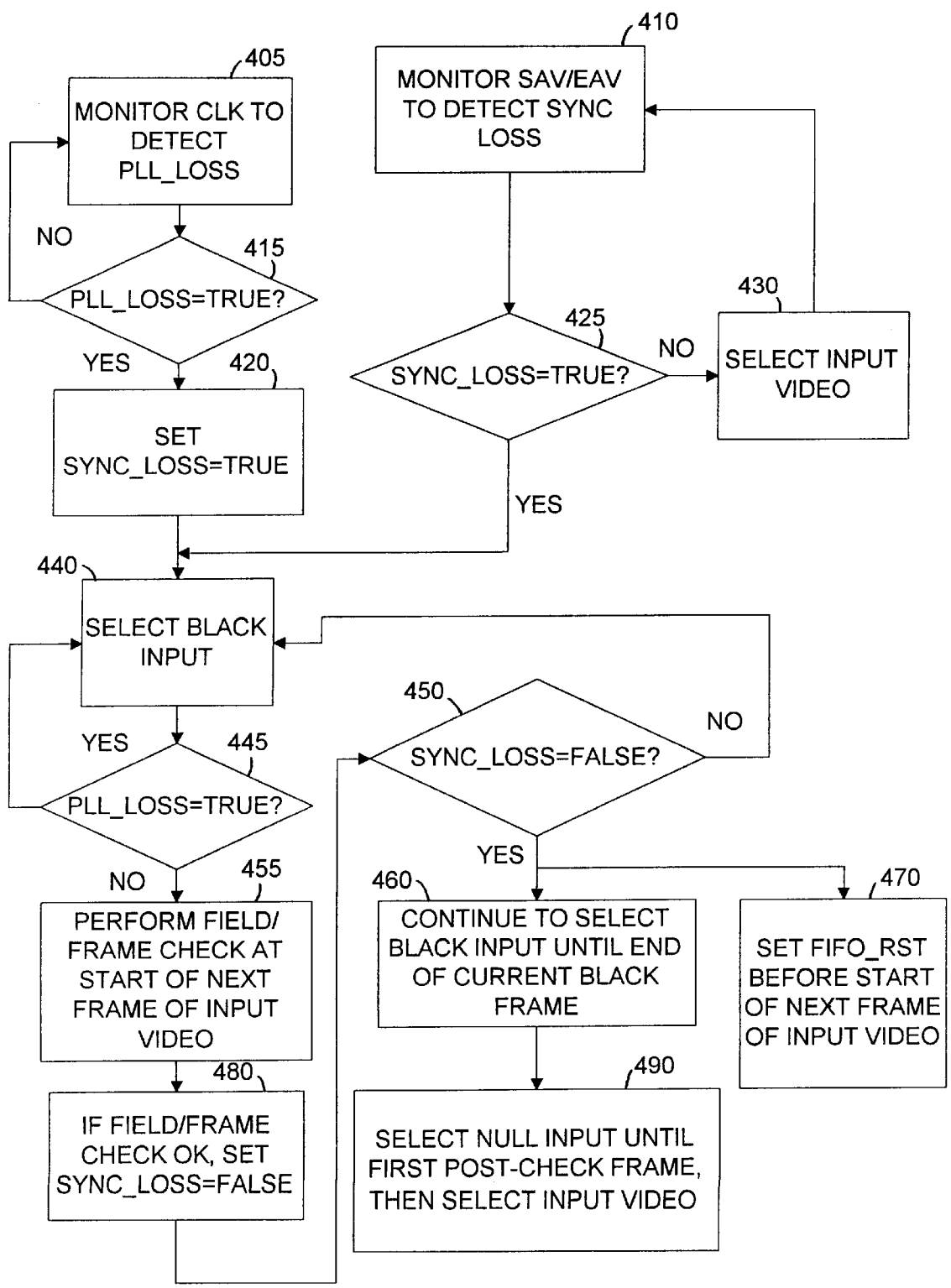
FIG. 4 illustrates a process flow during a sync loss in accordance with the present invention.

FIG. 4 illustrates a process flow during a sync loss in accordance with the present invention. Referring also to FIG. 1, at box 405 the video clock CLK is detected by the input video processor 125 and provided to the PLL 145 to detect a PLL loss. The PLL 145 sets the corresponding control word, PLL_LOSS. At box 415, if PLL_LOSS is true then the process flow returns to box 405. However, if PLL-LOSS is not true, the control word SYNC_LOSS is set equal true at box 420, thereby indicating a sync loss in the encoder.

While the PLL 145 is monitoring the clock signal associated with the input video signal, at box 410, the input video processor 125 is also monitoring the SAV/EAV fields to detect a sync loss. At box 425, if SYNC_LOSS is true, a black input is selected for the compressor at box 440. If SYNC_LOSS is not true, at box 430 the input video continues to be selected, and at box 410, the SAV/EAV fields continue to be monitored. Thus, the present invention provides two methods of determining sync loss in the input video signal. At box 445, if PLL_LOSS is still true, the black input continues to be selected at box 440. However, if PLL_LOSS is no longer true, at box 455, a field or frame check is performed at the start of the next frame of the input video. Specifically, for progressive scan input video, a frame check is performed at the start of the next frame following the transition of PLL_LOSS, while for interlaced scanned input video, a field check is performed at the start of the next frame following the transition of PLL_LOSS. At box 480, if the field or frame check is successful, SYNC_LOSS is set equal to false.

Optionally, it is possible to perform a field check on the next immediate field following the transition of PLL_LOSS, regardless of whether it is the first or second field of a frame.

At box 450, if SYNC_LOSS is not false, the black input continues to be selected at box 440. Generally, referring again to FIGS. 2 and 3, there is a period of time after PLL_LOSS transitions from low to high and the time when SYNC_LOSS transitions from low to high. This time accounts for a delay between the recovery of CLK and the completion of the field or frame check. Specifically, in FIG. 2, during the time between dashed lines 203 and 204, the paths from box 450 to box 440 will be followed. Similarly, in FIG. 3, during the time between dashed lines 304 and 305, the path between box 450 and box 440 will be followed.

However, at the time indicated by dashed line 204 in FIG. 2, or dashed line 305 in FIG. 3, SYNC_LOSS will transition from true to false, and the process flow will continue at boxes 460 and 470. At box 460 the black input will continue to be selected for communication to the compressor until the end of the current black frame. At box 490, the null input will be selected after the end of the last complete black frame until the post-check frame (i.e., the frame following the post-sync recovery field or frame in which a field or frame check occurs) is communicated to the compressor. The switch 140 of the formatter 135 is activated to begin communicating this first post-field or frame check video frame to the compressor. At box 470, FIFO_RST is set after SYNC_LOSS transitions to false, but before the start of the next frame of input video.

Note that, at box 490, the period for selecting a null video input may vary. Referring to FIGS. 2 and 3, the compressor input is either a complete frame comprising input video, black video, a combination of input and black video, or a null input.

Note also that, at box 410, the SAV and/or EAV fields are monitored in the input video signal. The SAV and EAV fields include a predetermined bit sequence which can be identified, and the fields are located in specific positions in each video line. Accordingly, the input video processor 125 can set the field SYNC_LOSS to true if the SAV and EAV bits do not match the expected bits, or the SAV and EAV fields are not in the expected locations in each video line. Refer also to the discussion in connection with FIGS. 6 and 7, below.

Figure 5:
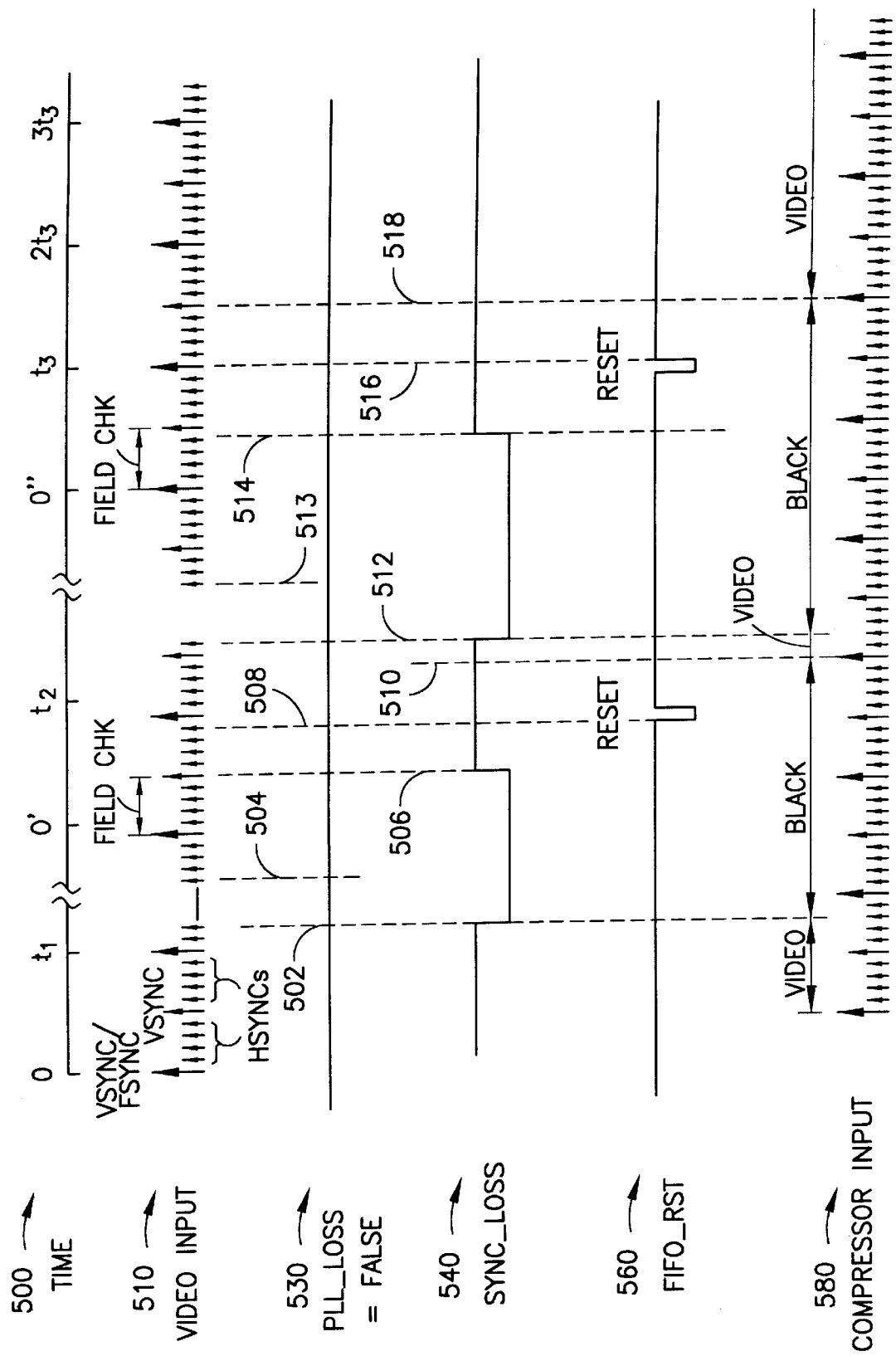
FIG. 5 illustrates an interlaced scan video input and a compressor input time line during multiple short-term sync losses, with no change in frame timing, in accordance with the present invention.

FIG. 5 illustrates an interlaced scan video input and a compressor input time line during multiple short-term sync losses, with no change in frame timing, in accordance with the present invention. Whereas FIG. 2 shows the case with interlaced input video with a PLL loss, and FIG. 3 shows the case with progressive scan video and a PLL loss, FIG. 5 shows the case with an interlaced scan video with a sync loss, but no PLL loss. This situation can arise when the input video processor 125 fails to detect the SAV and EAV fields in the expected locations, while the PLL 145 continues to detect CLK. A time line 500 is shown having three separate continuous sections. A first section includes time indexes 0 and $t_1$, while the second section includes the indexes 0' and $t_2$, and the third section includes the indexes 0", $t_3$, $2t_3$, and $3t_3$. Since there is no change in frame timing, each of the time line sections are in synchronism with one another.

Note that in any of FIGS. 2, 3 and 5 the separate continuous time lines may represent different frame rates, or the same frame rate. The present invention automatically accounts for changes in frame rate.

A video input 510, PLL_LOSS time line 530, SYNC_LOSS time line 540, FIFO_RST time line 560 and compressor input time line 580 are shown.

At the time indicated by dashed line 502, SYNC_LOSS transitions from high to low, indicating a sync loss, and the compressor input immediately switches from the input video to the black input according to the switch 140 of the formatter 135. At the time indicated by dashed line 504, the SAV and EAV fields in the video input are re-detected by the input video processor 125. However, re-synchronization is not declared right away. Instead, beginning at the start of the next video frame at time 0', a field check begins. The field in the period from 0' to $0.5t_2$ is a post-sync recovery field. At a time indicated by dashed line 506, only after a field check has been successfully completed, SYNC_LOSS transitions from low to high, thereby indicating re-synchronization of the encoder with the input video signal. Following the transition of SYNC_LOSS, and prior to the start of the next video frame at time $t_2$, FIFO_RST indicates a reset of the buffer pointer. The input video frame beginning at time $t_2$ (e.g., the post-check frame) is communicated to the compressor after a delay of one field, e.g. at time $1.5t_2$, upon activation of the switch 140.

The input video continues to be provided to the compressor as long as no further sync loss is detected. However, in the present example, another sync loss is detected by the input video processor 125 at the time indicated by dashed line 512. At this time, the switch 140 is reactivated to begin communicating black video to the compressor. Again, the black video is input to the compressor until such time that a re-synchronization has been detected, a field check has been successfully performed, a FIFO buffer reset has been performed, and the first full post-field check frame is available to the compressor, e.g. at time $1.5t_3$. The frame of the video input 510 at time $t_3$ (e.g., another post-check frame) corresponds to the frame of the compressor input at time $1.5t_3$.

Specifically, another field check begins at time 0" in another post-sync recovery field, and is completed at the time indicated by dashed line 514, just prior to time $0.5t_3$. The FIFO_RST signal designates a reset after the transition of SYNC_LOSS from low to high and prior to $t_3$.

Generally, in accordance with the invention, the input to the compressor is synchronized with the most recent reliable synchronized input video. Moreover, regardless of whether the post-sync loss frames are synchronized with the pre-sync loss frames of the video input, the compressor receives a synchronized input video or black video, or no data at all. Therefore, the presence of artifacts in the compressed video is avoided since no partial frames are received by the compressor. Moreover, the invention is suitable for use with non-video frames of data, including audio and other data.

Figure 6:
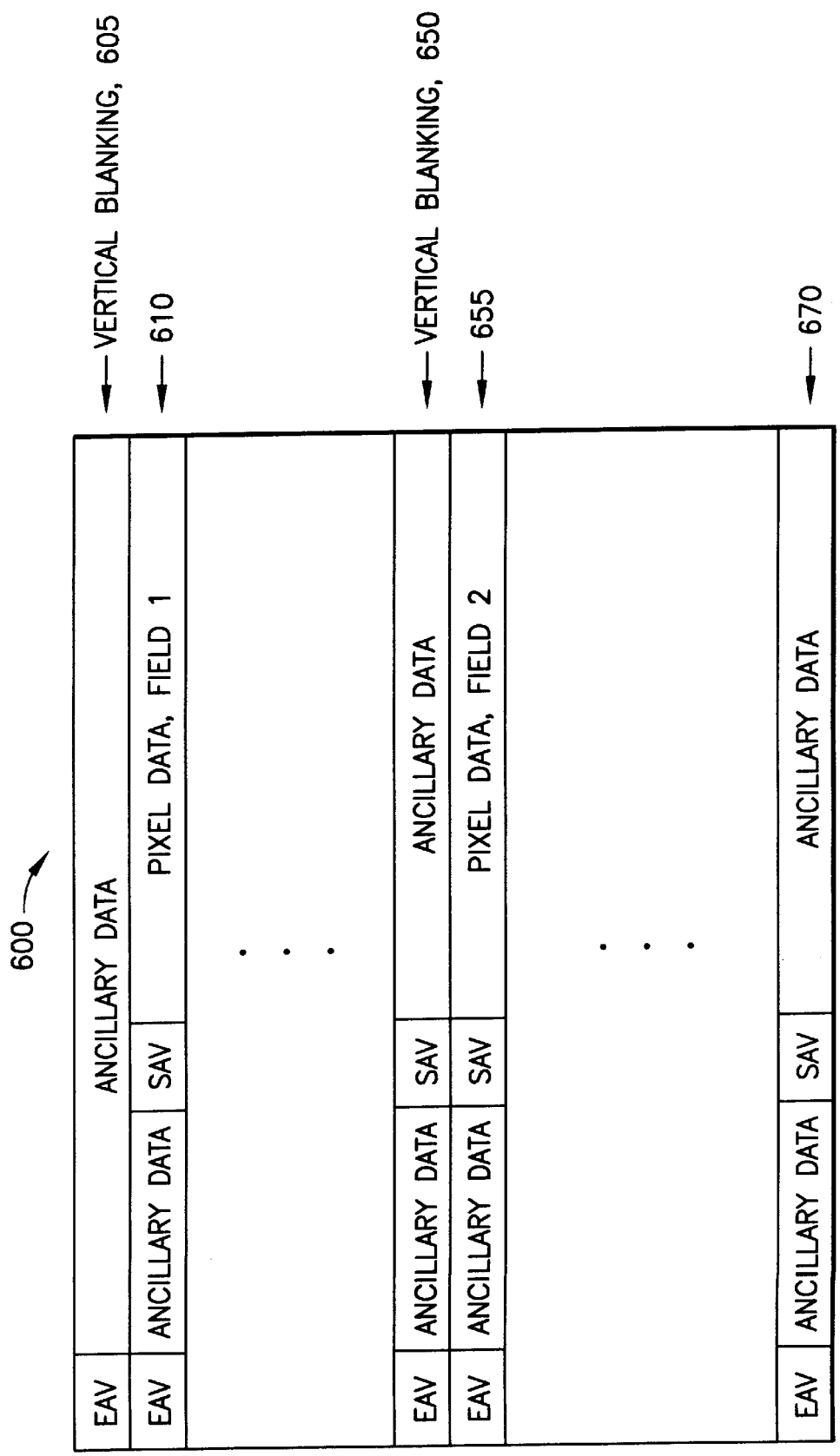
FIG. 6 illustrates a sample video frame for use with the present invention.

FIG. 6 illustrates a sample video frame for use with the present invention. A video frame, shown generally at 600, includes first and second field vertical blanking lines 605 and 650, respectively. Each field has a number of video lines. For example, each field in the frame 600 may have 540 active video lines. The first field vertical blanking line 605 includes an EAV field followed by ancillary data. Next, the first active video line 610 of the first field 610 includes an EAV field, followed by ancillary data, an SAV field, and pixel data. For example, a line of pixel data may have 1,280 or 1,920 active pixel samples for HDTV formats. 539 additional lines similar to line 610 follow line 610.

The second field vertical blanking line 650 includes an EAV field, followed by ancillary data, an SAV field, and more ancillary data. Next, the first active video line 655 of the second field includes an EAV field, followed by ancillary data, an SAV field, and pixel data. 539 additional lines similar to line 655 follow line 655. Line 670, the last line in the frame 600, includes an EAV field, followed by ancillary data, an SAV field, and more ancillary data.

As discussed in connection with FIG. 1, the EAV and/or SAV fields may be detected by the input video processor 125 to detect a sync loss or recovery of the input video.

Figure 7:
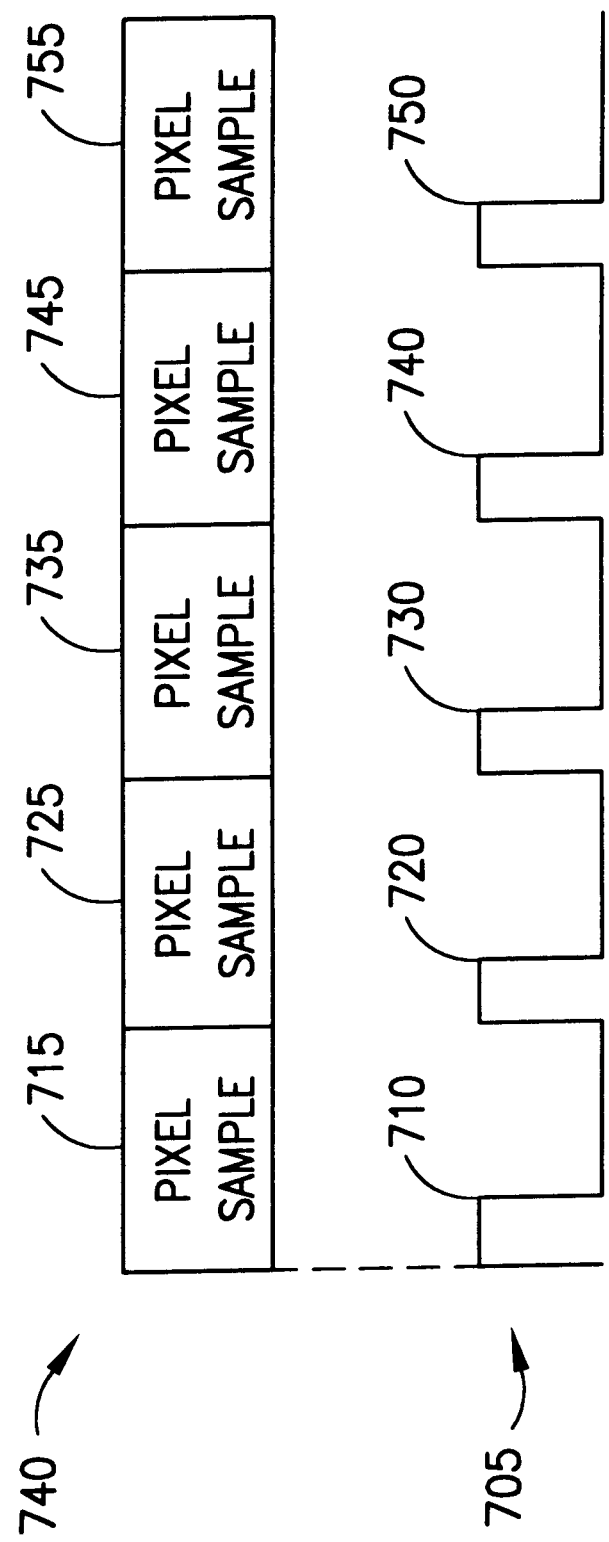
FIG. 7 illustrates a sample video line for use with the present invention.

FIG. 7 illustrates a sample video line for use with the present invention. Each pixel data line 740 in a frame includes successive pixel sample fields. Moreover, an associated clock signal 705 includes clock pulses CLK 710, 720, 730, 740 and 750 that correspond to pixel sample fields 715, 725, 735, 745 and 755, respectively. The CLK pulses are detected by the clock detector 208 of FIG. 2 to determine a clock rate of the input video signal.

Each pixel sample field 715, 725, 735, 745 and 755 includes luma pixel data and interpolated chroma pixel data.

As discussed in connection with FIG. 1, the CLK signal may be detected by the PLL circuit 145 to detect a sync loss or recovery of the input video. Moreover, it is possible to use the SAV/EAV fields in addition to the CLK signal for sync loss and recovery detection. The use of both techniques provides improved confidence of sync recovery.

As can be seen, the present invention provides a method and apparatus for processing a sequence of video or other data frames at a data encoder during a sync loss. When a sync loss is detected, black or pre-stored frames are provided in sync with the pre-sync loss frames until re-synchronization has been established. Null data is provided if necessary when the post-sync loss frames are not synchronized with the pre-sync loss frames. Data is provided to the compressor only as complete video frames to avoid artifacts that may occur with partial frames.

The system accommodates changes in clock rate and frame rate of the post-sync loss frames relative to the pre-sync loss frames. The system also accommodates post-sync loss frames which are either at the same time base (e.g., synchronous) or at a different time base (e.g., asynchronous) with the pre-sync loss frames.

Although the invention has been described in connection with various specific embodiments, those skilled in the art will appreciate that numerous adaptations and modifications may be made thereto without departing from the spirit and scope of the invention as set forth in the claims.

For example, while the invention was illustrated in terms of video data frames, the invention is suitable for use with any framed data. Moreover, the specific type of substitute data provided to the compressor during a sync loss may include black video, pre-stored video, or virtually any other type of data. For audio data, the substitute data may comprise a fixed tone or audio mute. Additionally, it is possible to provide a null signal in place of the substitute data.

What is claimed is:

1. A method for processing frames of data that are input to a data encoder when a loss of synchronization between the input data frames and the encoder is detected, comprising the steps of:
monitoring the input data frames to detect a sync loss thereof in a sync loss frame;
providing pre-sync loss input data of the input data frames to a data compressor of the encoder prior to detection of the sync loss;
providing substitute data to the data compressor in synchronism with the pre-sync loss input data when the sync loss is detected to complete a remainder of the sync loss frame so that the sync loss frame is provided to the data compressor as a complete frame;
monitoring the input data frames to detect a recovery of sync thereof; and
providing post-sync loss input data of the input data frames to the data compressor after the sync recovery is detected, and after a last frame including the substitute data is provided to the data compressor.

2. The method of claim 1, wherein:
the input data frames comprise video data; and
said substitute data comprises black video data.

3. The method of claim 1, wherein:
the input data frames comprise audio data.

4. The method of claim 1, wherein:
said substitute data is pre-stored.

5. The method of claim 1, wherein the pre-sync loss input data comprises a plurality of video lines, at least some of the lines having start of active video (SAV) or end of active video (EAV) fields, comprising the further step of:
monitoring the SAV or EAV fields to detect the sync loss.

6. The method of claim 1, comprising the further step of:
monitoring an input clock signal that is associated with the pre-sync loss input data to detect the sync loss.

7. The method of claim 1, wherein:
said sync loss frame is followed by at least one complete frame comprising the substitute data instead of the input data.

8. The method of claim 1, comprising the further steps of:
performing a field or frame check on a post-sync recovery frame, which is a full frame of the post-sync loss input data after the sync recovery is initially detected; and
providing a post-check frame, which is a first frame of the post-sync loss input data after the post-sync recovery frame, to the data compressor.

9. The method of claim 8, comprising the further step of:
providing a null data sequence to the data compressor after a last substitute frame comprising the substitute data is provided to the data compressor, and until said post-check frame is provided to the data compressor.

10. The method of claim 9, wherein:
said pre-sync loss input data is asynchronous with said post-sync loss input data.

11. The method of claim 8, comprising the further steps of:
buffering the input data frames; and
providing a buffer reset signal after the sync recovery is detected, and prior to a start of the post-check frame.

12. The method of claim 8, comprising the further step of:
monitoring an input clock signal that is associated with the post-sync recovery frame to detect the sync recovery.

13. The method of claim 8, wherein said post-check frame comprises a plurality of video lines, at least some of the lines having start of active video (SAV) or end of active video (EAV) fields, comprising the further step of:
performing the field or frame check on said post-sync recovery frame by monitoring the SAV or EAV fields thereof.

14. The method of claim 8, wherein:
said post-sync recovery frame is a first full frame of the post-sync loss input data after the sync recovery is initially detected.

15. An apparatus for processing frames of data that are input to a data encoder when a loss of synchronization between the input data frames and the encoder is detected, comprising:
first means for monitoring the input data frames to detect a sync loss thereof in a sync loss frame;
means for providing pre-sync loss input data of the input data frames to a data compressor of the encoder prior to detection of the sync loss;
means for providing substitute data to the data compressor in synchronism with the pre-sync loss input data when the sync loss is detected to complete a remainder of the sync loss frame so that the sync loss frame is provided to the data compressor as a complete frame;
second means for monitoring the input data frames to detect a recovery of sync thereof; and
means for providing post-sync loss input data of the input data frames to the data compressor after the sync recovery is detected, and after a last frame including the substitute data is provided to the data compressor.

16. The apparatus of claim 15, wherein the input data frames comprise video data, further comprising:
means for generating said substitute data as black video data.

17. The apparatus of claim 15, wherein:
the input data frames comprise audio data.

18. The apparatus of claim 15, further comprising:
means for pre-storing said substitute data.

19. The apparatus of claim 15, wherein:
the pre-sync loss input data comprises a plurality of video lines, at least some of the lines having start of active video (SAV) or end of active video (EAV) fields; and
said first means monitors the SAV or EAV fields to detect the sync loss.

20. The apparatus of claim 15, wherein:
said first monitoring means monitors an input clock signal that is associated with the pre-sync loss input data to detect the sync loss.

21. The apparatus of claim 15, wherein:
said sync loss frame is followed by at least one complete frame comprising the substitute data instead of the input data.

22. The apparatus of claim 15, further comprising:
means for performing a field or frame check on a post-sync recovery frame, which is a full frame of the post-sync loss input data after the sync recovery is initially detected; and
means for providing a post-check frame, which is a first frame of the post-sync loss input data after the post-sync recovery frame, to the data compressor.

23. The apparatus of claim 22, further comprising:
means for providing a null data sequence to the data compressor after a last substitute frame comprising the substitute data is provided to the data compressor, and until said post-check frame is provided to the data compressor.

24. The apparatus of claim 23, wherein:
said pre-sync loss input data is asynchronous with said post-sync loss input data.

25. The apparatus of claim 22, further comprising:
buffer means for buffering the input data frames; and
means for providing a buffer reset signal after the sync recovery is detected, and prior to a start of the post-check frame.

26. The apparatus of claim 22, wherein:
said second monitoring means monitors an input clock signal that is associated with the post-sync loss input data to detect the sync recovery.

27. The apparatus of claim 22, wherein:
said post-check frame comprises a plurality of video lines, at least some of the lines having start of active video (SAV) or end of active video (EAV) fields; and
said means for performing a field or frame check performs the field or frame check on said post-sync recovery frame by monitoring the SAV or EAV fields thereof.

28. The apparatus of claim 22, wherein:
said post-sync recovery frame is a first full frame of the post-sync loss input data after the sync recovery is initially detected.

29. The method of claim 1, wherein the sync loss is caused by at least one of:
a change in a source of the input data frames;
a change in a clock rate of the input data frames; and
a data drop out in the input data frames.

30. The method of claim 1, wherein:
said pre-sync loss input data is synchronous with said post-sync loss input data.

31. The apparatus of claim 15, wherein the sync loss is caused by at least one of:
a change in a source of the input data frames;
a change in a clock rate of the input data frames; and
a data drop out in the input data frames.

32. The apparatus of claim 15, wherein:
said pre-sync loss input data is synchronous with said post-sync loss input data.

* * * * *